Patented Feb. 3, 1931

1,790,905

UNITED STATES PATENT OFFICE

JOSHUA F. DARLING, OF WOODSTOWN, NEW JERSEY, ASSIGNOR TO E. I. DU PONT DE NEMOURS & COMPANY, OF WILMINGTON, DELAWARE, A CORPORATION OF DELAWARE

RECOVERY OF PHOSPHOTUNGSTATES

No Drawing. Application filed July 25, 1929. Serial No. 381,084.

This invention relates to the purification of phosphotungstate compounds. In the manufacture and use of phosphotungstate compounds, such as $3Na_2O.P_2O_5.24WO_3$ or $3Na_2O.P_2O_5.16WO_3$, mother liquors are obtained from which it may be desirable to recover the tungsten salts. Various methods of recovery and purification of the phosphotungstates have been employed. Among the prior art methods are (1) precipitation with lime in the form of a calcium phosphotungstate, (2) precipitation in the form of an oxide of tungsten by the addition of hydrochloric acid, (3) evaporation of the mother liquors to dryness. An objection to each of these and similar methods of recovery is that the tungsten is obtained in such a form that it cannot be used in certain processes, such as the making of color lakes, until a very expensive purification has been carried out.

My invention has for an object the purification and recovery of phosphotungstates by a series of simple and readily controlled steps which effect the purification in an inexpensive and efficient manner. A further object of my invention is the production of pure phosphotungstates, both dry and in solution. Other objects will appear as the description proceeds.

My invention, in its broad aspect, consists in separating the phosphotungstates from the crude liquors in the form of a relatively insoluble phosphotungstate amine complex. This complex may be separated from the crude liquors by filtration or any satisfactory method, and after placed in solution or suspension in an alkaline liquor is steam distilled to break down the complex and remove the volatile amine. The resulting liquor is a more or less concentrated solution of pure phosphotungstate.

My method consists more explicitly in adding to the mother liquor containing the phosphotungstate, such as sodium phosphotungstate, a volatile aromatic amine, such as di-methyl aniline, and a mineral acid, such as hydrochloric acid (the amine being employed in slight excess), and thus precipitating the tungsten in the form of a complex di-methyl aniline phosphotungstate. This complex is filtered from the solution, thus separating the phosphotungstate from any soluble salts present in the original mother liquor. The precipitate is placed in a still to which is added a solution of alkali, preferably an excess of caustic soda, and then the mixture is steam distilled, during which procedure the complex di-methyl aniline phosphotungstate is broken up, the di-methyl aniline being distilled out of the mixture and collected, and sodium phosphotungstate remaining in solution. I find it advantageous to clarify this solution by simple filtration, and to adjust the concentration of tungsten by either dilution or evaporation, as desired.

Following is an example of my invention:

*Example 1.*—To 1,000 gallons of mother liquor, which by analysis has been found to contain approximately 50 pounds of tungsten in the form of phosphotungstates, I add at room temperature 150 pounds of 20° Bé, hydrochloric acid, and 20 pounds of di-methyl-aniline. After thorough mixing, during which agitation may be employed, the precipitate is filtered off and placed in a still, to which is then added 30 pounds of caustic soda dissolved in 50 gallons of water. The mixture is steam distilled until the di-methyl aniline is entirely removed. The solution in the still containing the sodium phosphotungstate is clarified and is then ready for use.

*Example 2.*—The procedure employed is the same as in Example 1, except that mono ethyl aniline is substituted for di-methyl aniline.

*Example 3.*—The procedure is the same as in Example 1, except that 18 pounds of ortho toluidine is substituted for 20 pounds of di-methyl aniline, and 42 pounds of caustic potash is employed instead of 30 pounds of caustic soda.

The examples given hereabove are for the purposes of illustration only, it being understood that I do not wish to be restricted to the precise ingredients, quantities or conditions set forth in the examples. Instead of di-methyl aniline, I may use any aromatic amine which is volatile with steam. Thus, aniline and its homologues and derivatives may be employed. Mono ethyl aniline, mono methyl aniline, di-methyl aniline, di-ethyl aniline, ortho toluidine and mono ethyl ortho toluidine are examples of the amines which I may use. Other mineral acids may be employed, it being essential, of course, that the concentration of the acid and the character thereof be such as not to effect the phosphotungstate in an adverse manner. Alkalines other than caustic soda may be employed, it being desirable, of course, that the material used have sufficient basicity to enable the steam to break down the complex during the steam distillation.

My invention offers numerous advantages in the recovery and purification of phosphotungstates. It is readily controlled, inexpensive, and results in a solution of phosphotungstate which is ready for numerous uses such as, for example, use in the manufacture of phosphotungstate lakes.

As many apparently widely different embodiments of this invention may be made without departing from the spirit thereof, it is to be understood that I do not limit myself to the foregoing examples or descriptions execept as indicated in the following patent claims.

I claim:

1. A method of purifying phosphotungstates which comprises acidifying the crude tungstate liquor, adding an aromatic amine to the acidified liquor, removing the precipitated phosphotungstate formed thereby, treating the precipitate with an alkaline substance and steam distilling to remove the amine.

2. A method of purifying phosphotungstates which comprises treating the crude tungstate liquor with a mineral acid, adding an aromatic amine to the acidified liquor, filtering the precipitated phosphotungstate, treating the precipitate with an alkaline hydroxide and steam distilling to remove the amine.

3. A method of purifying phosphotungstates which comprises treating the crude tungstate liquor with hydrochloric acid, adding an aromatic amine to the acidified liquor, filtering off the precipitated phosphotungstate, treating the precipitate with an alkaline hydroxide and steam distilling to remove the amine.

4. A method of purifying phosphotungstates which comprises treating the crude tungstate liquor with hydrochloric acid, adding an alkyl substituted amine to the acidified liquor, filtering off the precipitated phosphotungstate, treating the precipitate with an alkaline hydroxide and steam distilling to remove the amine.

5. A method of purifying phosphotungstates which comprises treating the crude tungstate liquor with hydrochloric acid and di-methyl aniline, filtering off the precipitate, treating the precipitate with sodium hydroxide and steam distilling the alkaline liquor until the di-methyl aniline has been removed.

6. A method of manufacturing pure sodium phosphotungstates which comprises treating a relatively impure phosphotungstate liquor with hydrochloric acid and di-methyl aniline, filtering off the precipitate formed, treating the precipitate with sodium hydroxide and steam distilling the alkaline liquor until the di-methyl aniline has been removed.

7. A method of purifying phosphotungstates which comprises treating the crude tungstate liquor with hydrochloric acid and mono-ethyl-aniline, filtering off the precipitate, treating the precipitate with sodium hydroxide and steam distilling the alkaline liquor until the mono-ethyl-aniline has been removed.

8. A method of purifying phosphotungstates which comprises treating the crude tungstate liquor with hydrochloric acid and ortho-toluidine, filtering off the precipitate, treating the precipitate with potassium hydroxide and steam distilling the alkaline liquor until the ortho-toluidine has been removed.

In testimony whereof, I affix my signature.

JOSHUA F. DARLING.